Patented Oct. 25, 1949

2,485,697

UNITED STATES PATENT OFFICE 2,485,697

PREPARATION OF ARSENIC TRICHLORIDE

Joseph A. Chenicek, Riverside, Ill., assignor to Universal Oil Products Company, Chicago, Ill., a corporation of Delaware No Drawing. Application March 22, 1946,
Serial No. 656,499

3 Claims. (Cl. 23—98)

This invention relates to the preparation of metal halides and more particularly to the preparation of metal halides by the reaction of Friedel-Crafts metal halides with metal oxides.

"Friedel-Crafts metal halides" have now come to mean metal halides which are capable of catalyzing the reaction of benzene with an alkyl halide and/or an acid halide, and the term is so used in the present specification and claims. More specifically, Friedel-Crafts metal halides include aluminum chloride, antimony chloride, bismuth chloride, iron chloride, stannic chloride, tantalum chloride, titanium chloride, zinc chloride, zirconium chloride, etc. The corresponding bromides, iodides and fluorides are in some cases included as Friedel-Crafts metal halides but, in general, these other halides are more expensive to produce and therefore have not been used as frequently as have the chlorides and, in other cases, these other halides are unstable under the temperature conditions utilized in the reaction, while, in still other cases, certain of these halides are not considered as Friedel-Crafts catalysts because they do not catalyze the reactions hereinbefore set forth. For example, aluminum bromide will catalyze the reactions and therefore is considered as a Friedel-Crafts catalyst while, on the other hand, aluminum fluoride will not catalyze the reactions and therefore is not considered as a Friedel-Crafts catalyst.

In addition to the reactions hereinbefore set forth, Friedel-Crafts catalysts are used to catalyze numerous condensation reactions including particularly alkylation of iso-paraffins or aromatics with olefins or olefin-acting substances, and other reactions including isomerization of paraffins and cycloparaffins, cracking of higher boiling hydrocarbons to produce gasoline, refining of hydrocarbon fractions, such as gasoline, to improve octane characteristics, color, gum, and other properties.

When utilized as a catalyst in the reactions hereinbefore set forth, aluminum chloride inherently forms a complex with hydrocarbons and particularly with the olefinic and aromatic constituents thereof. One of the major drawbacks to the use of aluminum chloride as a catalyst for these reactions is that no ready method has heretofore been proposed for recovering the aluminum chloride from the complex for reuse in the process and, therefore, the cost of the aluminum chloride catalyst is usually excessive. The present invention offers a novel method of utilizing these complexes to prepare valuable products therefrom.

While the present invention is particularly applicable to the utilization of aluminum chloride-hydrocarbon complexes, in a broad aspect the present invention also proposes a novel method of manufacturing a halide of a metal by reacting an oxide of said metal with a Friedel-Crafts metal halide.

In a broad aspect the present invention relates to a method of preparing a halide of a metal which comprises reacting an oxide of said metal with a Friedel-Crafts metal halide under conditions to form said halide of a metal.

In a specific embodiment, the present invention relates to a method for recovering valuable products from a complex comprising a hydrocarbon and a Friedel-Crafts metal halide which comprises reacting said complex with an oxide of a metal, said last mentioned metal being different from the metal of said Friedel-Crafts metal halide, under conditions to form a metal halide different from said Friedel-Crafts metal halide and an oxide of a metal corresponding to the metal of said Friedel-Crafts metal halide.

The Friedel-Crafts metal halides which are utilized in accordance with the present invention have been hereinbefore set forth. The metal oxide which is reacted with the Friedel-Crafts metal halide may comprise any suitable metal oxide, including the oxides of metals corresponding to the metal within the Friedel-Crafts metal halide classification, as well as other metal oxides, such as arsenic trioxide. When the metal oxide corresponds to the metal within the Friedel-Crafts metal halide classification, the specific metal of the metal oxide should, of course, be different from the metal of the metal halide. For example, if aluminum chloride is the Friedel-Crafts metal halide, the metal oxide should, of course, be an oxide other than that of aluminum.

It is understood that the terminology "an oxide of a metal corresponding to the metal of the metal halide" means that the metal of the oxide is the same as the metal of the metal halide. For example, aluminum in aluminum oxide corresponds to aluminum in aluminum halide.

It is believed that the reaction of one embodiment of the present invention may be represented by the following equation, although it is understood that the invention is not limited to this particular mechanism.

$$2MCl_3 + Q_2O_3 \rightarrow M_2O_3 + 2QCl_3$$

where M is a metal of a Friedel-Crafts metal halide and Q is a metal different from M.

In accordance with the invention, a Friedel-Crafts metal halide is commingled with an oxide of a different metal, said mixture being anhydrous as the presence of water is undesirable because it may result in hydrolysis of the metal halide. In general, the reaction may be initiated at atmospheric temperature but, if required, the mixture may be heated or cooled as desired. After the reaction has proceeded to the desired extent, the products may be separated by any convenient method. In most cases, the resultant metal halide will distill at a considerably lower temperature than that of the remaining metal oxide and therefore the separation may be effected by distillation. For example, arsenic trichloride has a boiling point of about 130° C. and stannic chloride has a boiling point of about 114° C. whereas the metal oxides have considerably higher boiling points. In cases where the metal halide has too high a boiling point or decomposes at too low a temperature, the separation may be effected in any other suitable manner. For example, antimony trichloride is soluble in hydrocarbons and therefore may be separated by solvent extraction in a suitable hydrocarbon fraction. In still other cases, the separation may be effected by floatation means as commonly used in the separation of ores.

In a similar manner, aluminum chloride-hydrocarbon complexes may be commingled with the desired metal oxide, heated or cooled if necessary, and the products separated in any suitable manner as hereinbefore set forth. During the course of the reaction, hydrocarbons are liberated and may be recovered by any suitable method.

The novelty and utility of the invention is illustrated further by the following example. It is understood that the broad scope of the invention is not limited to the specific example herein set forth.

The aluminum chloride-hydrocarbon complex utilized in this example was formed during the isomerization of normal butane at a temperature of 85% C. The complex by analysis contained 69% by weight of aluminum chloride. 150 grams of this complex was placed in a 500 ml. round bottom flask. A total of 70 grams of arsenic trioxide was slowly added, the flask being cooled to absorb the heat of reaction. After all of the arsenic trioxide was added and the reaction had proceeded to the desired extent, the flask was heated and the products distilled. Considerable fuming occurred with the evolution of volatile organic arsenic compounds. The overhead fraction from the distillation was condensed and allowed to settle. Two liquid layers formed, the upper layer comprising 4 grams of an organic arsenic compound and the lower layer comprising 59 grams of arsenic trichloride.

It will be noted that, in addition to preparing high yields of arsenic trichloride, an organo-arsenic compound was produced, and the present invention may also be considered as a method of manufacturing organo-metallic compounds.

I claim as my invention:

1. A method of recovering valuable products from an aluminum chloride-hydrocarbon complex which comprises reacting said complex with arsenic trioxide under conditions to form arsenic trichloride and aluminum oxide.

2. The process of claim 1 further characterized in that hydrocarbons liberated by said reaction are separately recovered.

3. A process for preparing arsenic trichloride and organic arsenic compound from an aluminum chloride-hydrocarbon complex which comprises reacting said complex with arsenic trioxide, and recovering said arsenic trichloride and organic arsenic compound from the reaction products.

JOSEPH A. CHENICEK.

REFERENCES CITED

The following references are of record in the file of this patent:

UNITED STATES PATENTS

| Number | Name | Date |
| --- | --- | --- |
| 1,369,729 | Danckwardt | Feb. 22, 1921 |
| 1,997,304 | Lofton et al. | Apr. 9, 1935 |